United States Patent [19]

Janssen et al.

[11] Patent Number: 4,894,845
[45] Date of Patent: Jan. 16, 1990

[54] RECEIVER FOR A PHASE-SHIFT KEYED CARRIER SIGNAL

[75] Inventors: Gerardus J. M. Janssen, Zoetermeer; Antonius P. Verlijsdonk, Nuenen, both of Netherlands

[73] Assignee: U.S. Philips Corporation, New York, N.Y.

[21] Appl. No.: 201,512

[22] Filed: Jun. 1, 1988

[30] Foreign Application Priority Data

Jun. 2, 1987 [NL] Netherlands ............ 8701290

[51] Int. Cl.$^4$ .............................. H03D 3/22
[52] U.S. Cl. ........................ 375/83; 328/164; 329/304
[58] Field of Search ............ 375/4, 83, 81, 97, 110; 328/164; 329/104, 105, 110, 50

[56] References Cited

U.S. PATENT DOCUMENTS 4,592,075  5/1986  Tsukamoto .................. 375/81
4,757,272  7/1988  Okada et al. ................. 329/110

Primary Examiner—Benedict V. Safourek
Assistant Examiner—Tesfaldet Bocure
Attorney, Agent, or Firm—Michael E. Marion

[57] ABSTRACT

A receiver for a PSK-signal includes a demodulator for obtaining a demodulated data signal which after regeneration is applied to a remodulator for PKS-remodulation of the received PSK-signal to produce thereby a carrier component that is applied as an input signal to a phase-locked loop in which a local carrier generator is included. The reliability of the carrier recovery for low SNR-values can be improved by the generation of delayed and advanced versions of the regenerated data signal, and by providing the receiver in addition with a clock tracking unit, responsive to the received PSK-signal, the local carrier and the delayed and advanced data signal versions, for generating a control signal for a local clock generator connected to the regeneration means.

2 Claims, 2 Drawing Sheets

4,894,845

RECEIVER FOR A PHASE-SHIFT KEYED CARRIER SIGNAL

BACKGROUND OF THE INVENTION

The invention relates to a receiver for a passband signal generated by phase-shift keying of a carrier in accordance with a data signal of a predetermined symbol rate 1/T, the receiver comprising:

demodulation means for demodulating the received passband signal with the aid of a local carrier and thereby producing a demodulated data signal;

regeneration means for regenerating the demodulated data signal with the aid of a local clock and thereby producing a regenerated data signal;

carrier recovery means having a local carrier generator included in a phase-locked loop and connected to the demodulation means, and having a remodulator for phase-shift keying of the received passband signal in accordance with the regenerated data signal and thereby producing a carrier component as an input signal for the phase-locked loop; and a local clock generator connected to the regeneration means.

A receiver having such a structure is known from the second edition of the book "Phase Lock Techniques" by F. M. Gardner, Wiley, New York, 1979, Chapter 11, Section 11.2, pp. 216–230.

For data transmission with the aid of phase-shift keying (PSK) of a carrier, a first requirement for an optimum detection of the data signal is the availability of a stable local carrier with little phase jitter in the receiver to enable coherent demodulation of the received modulation band signal (PSK-signal). A known method to obtain this local carrier utilizes the principle of PSK-remodulating the received PSK-signal in accordance with the demodulated data signal for producing a carrier component that is used as an input signal for a phase-locked loop (PLL) in which a local carrier generator is included (cf. FIGS. 11.4, 11.5 and 11.8 on pp. 219, 220 and 223 of the above-mentioned book by Gardner). In applications of the receiver in systems in which the available signal power is limited and the channel properties are unfavorable, as in the case in systems for satellite communication and systems for mobile communication, the signal-to-noise ratio (SNR) at the input of the receiver can assume relatively low values. In these circumstances, the PSK-remodulation should preferably be performed by using the data signal regenerated as regards amplitude and instant of occurrence instead of the demodulated data signal itself, as the improvement in noise suppression results in a reliable recovery of the carrier at lower SNR-values at the input of the receiver. True enough, the error probability of the received data symbols becomes indeed greater at these lower SNR-values, but the influence of the increased error probability can effectively be combated by the use of error-correcting codes as long as the receiver provides for a reliably recovered carrier. A requirement to achieve this improvement in the transmission quality is that the receiver provides, also at these lower SNR-values, a stable local clock with little phase jitter. When use is made of the known methods for recovering the local clock from the demodulated data signal, as described in Section 11.3, pp. 230–249 of said book by Gardner, there is however the disadvantage that the generation of a clock component as an input signal for a phase-locked loop including the local clock generator, generally requires operations which result in the introduction of additional noise in the control signal for the local clock generator. This is more specifically the case with operations such as rectifying, squaring or limiting, which are based on the use of elements having a non-linear amplitude transfer characteristic. The additional noise thus introduced implies that higher SNR-values are required at the input of the receiver so as to be able to ensure a reliable clock recovery.

SUMMARY OF THE INVENTION

The invention has for its object to provide a novel concept for providing a local clock in a receiver of the type defined in the opening paragraph, the concept rendering it possible to improve the reliability of the carrier covery at low SNR-values at the input of the receiver.

According to the invention, the receiver is therefore characterized in that the regeneration means are arranged for also producing a delayed and an advanced version of the regenerated data signal with a delay and an advance, respectively, relative to the regenerated data signal, over a time interval Δ less than symbol interval T, and the receiver also includes means responsive to the received passband signal and the local carrier for generating a baseband control signal for the local clock generator, the control signal being representative of the difference between the correlation function of the data signal inherent to the received passband band signal with the delayed version of the regenerated data signal and the correlation function of the data signal inherent to the received passband signal with the advanced version of the regenerated data signal, the local clock generator, in response to said control signal, applying a local clock to the regeneration means such that the regenerated data signal is in synchronism with the data signal which is inherent to the received passband signal applied to the remodulator.

BRIEF DESCRIPTION OF THE DRAWINGS

The invention will now be described in greater detail with reference to the accompanying drawings, in which.

DETAILED DESCRIPTION OF THE INVENTION

The present receiver is described in greater detail for the case in which the received passband band signal is generated in the transmitter by phase-shift keying (PSK) of a carrier with a frequency $f_c$ of, for example, $f_c = 70$ MHz in accordance with a binary data signal a(t), wherein the symbols (bits) have a waveform of the NRZ-type (non-return-to-zero) and occur at a symbol (bit) rate 1/T of, for example, 1/T = 1 MHz, and the spectrum of the binary PSK-signal thus generated (referred to as the BPSK-signal hereinafter) is limited by means of filtering to its main lobe having a width of $2/T = 2$ MHz.

Figure 1:
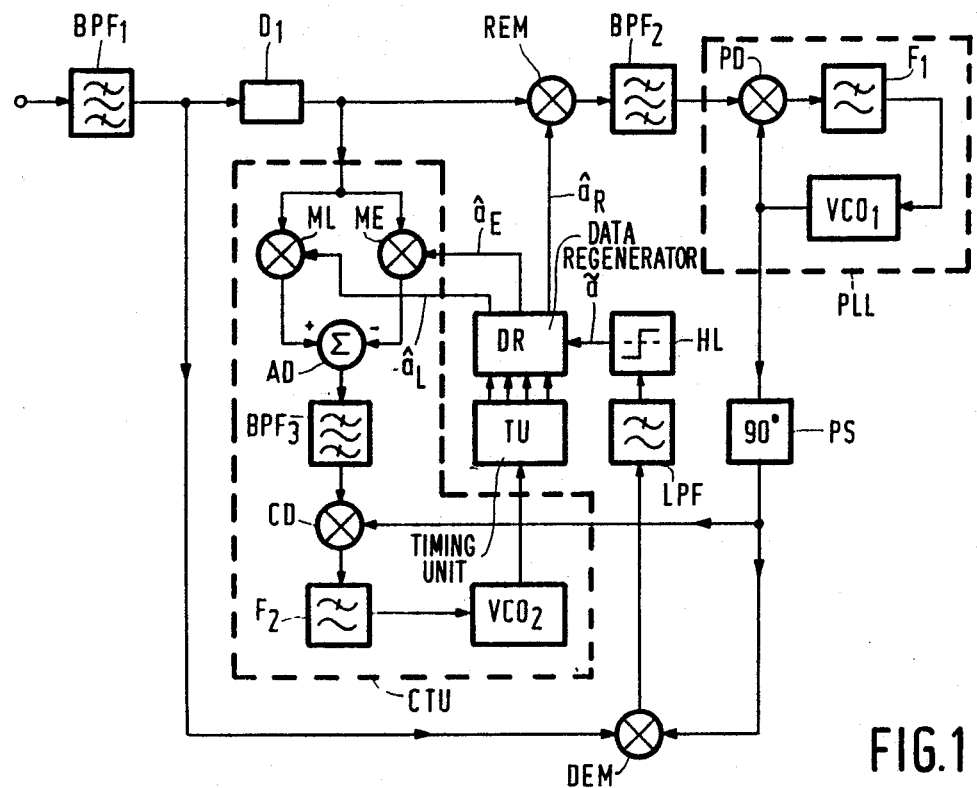
FIG. 1: is a block diagram of a receiver according to the invention for binary PSK-signals.

In the receiver shown in FIG. 1, noise and interference ae removed from the received BPSK-signal as well as possible with the aid of a bandpass filter $BPF_1$ having a center frequency equal to the carrier frequency $f_c = 70$ MHz and having a band width which is chosen such that no appreciable loss of signal power occurs. In view of the width $2/T = 2$ MHz of the main lobe of the BPSK spectrum a (3 dB) bandwidth of approximately 2.5 MHz is a suitable choice for this band pass filter $BPF_1$. The BPSK-signal thus filtered is coherently demodulated in a PSK demodulator DEM which in this case is constituted by a multiplier, and the demodulated data signal is selected with the aid of a lowpass filter LPF having a transfer characteristic which is predominantly constant for frequencies up to approximately the Nyquist frequency $1/(2T)$ of the binary data signal $a(t)$. A suitable choice for this lowpass filter LPF is a fourth-order Butterworth-Thomson filter havng a (3 dB) bandwidth of $0.54/T = 540$ KHz.

The local carrier of frequency $f_c$ necessary for the coherent demodulation is recovered from the received BPSK-signal using the principle of PSK-remodulating this BPSK-signal in accordance with the demodulated data signal for producing a carrier component that is used as an input signal for a phase-locked loop in which a local carrier generator is included. To obtain a local carrier with the lowest possible phase jitter, the PSK-remodulation should preferably be perfomed by using the data signal, regenerated as regards the amplitude and instant of occurrence, instead of demodulated data signal itself.

In the receiver of FIG. 1, the system for the recovery of the local carrier, described in the forgoing, is now implemented as follows. The demodulated data signal at the output of the lowpass filter LPF is applied to a hard limiter HL to obtain an amplitude-regenerated binary data signal $\tilde{a}(t)$ that is subsequently regenerated as regards instant of occurrence in a binary data regenerator DR which is connected through a timing unit TU to a generator $VCO_2$ for generating a local clock having a bit rate $1/T$. Data regenerator DR applies a completely regenerated, i.e. as regards both amplitude and instant of occurrence, binary data signal $\hat{a}_R(t)$ to a PSK-remodulator REM for the received BPSK-signal, the remodulator REM in this case again being constituted by a multiplier. Since both lowpass filter LPF and also data regenerator DR introduce a delay, the filtered BPSK-signal at the output of bandpass filter $BPF_1$ is applied to remodulator REM through a delay element $D_1$ to introduce a compensating delay, so that the regenerated data signal $\hat{a}_R(t)$ is in synchronism with the data signal $\tilde{a}(t)$ that is inherent to the filtered BPSK-signal applied to the remodulator REM. If, for the sake of simplicity, the influence of filtering and the influence of noise and interference are not considered and the BPSK-signal applied to remodulator REM is written as $$a(t) \cdot \sin(2\pi f_c t + \theta_c)$$

wherein $\theta_c$ is the carrier phase, then remodulation in accordance with the regenerated data signal $\hat{a}_R(t)$ results in a signal of the form $$\hat{a}_R(t) \cdot a(t) \cdot \sin(2\pi f_c t + \theta_c)$$

If no transmission errors occur, $\hat{a}_R(t)$ is equal to $a(t)$ so that, neglecting a scale factor which is not important here a perfect carrier reference $$\sin(2\pi f_c t + \theta_c)$$

is recovered. However, in actual practice, bit errors always occur in $\hat{a}_R(t)$ with a given bit error rate and furthermore $\hat{a}_R(t)$ is not fully bit-synchronous with $a(t)$ due to phase deviations of local clock generator $VCO_2$ which result in a shift of $\hat{a}_R(t)$ relative to $a(t)$ over a time interval $pT$ (denoted the clock phase error hereinafter). The absolute value of this clock phase error $pT$ never exceeds $T/2$ since a shift of the local clock over a time interval $-T/2$ is equivalent to a shift over a time interval $+T/2$. These clock phase errors and also the bit errors cause brief sign inversions of the product $\hat{a}_R(t) \cdot a(t)$ and consequently of the carrier component at the output of remodulator REM. As a result, this carrier component is contaminated by multiplicative noise and moreover by additive noise and interference penetrating into the receiver from the input. The output signal of remodulator REM is therefore first filtered with the aid of a bandpass fiter $BPF_2$ having a center frequency equal to carrier frequency $f_c = 70$ MHz and having a (3 dB) bandwidth of, for example, 200 KHz, and is thereafter applied to a phase-locked loop PLL in which a signal-controlled generator $VCO_1$ is incorporated for generating a local carrier of frequency $f_c$. In addition, this phase-locked loop PLL includes a phase detector PD for detecting the instantaneous phase difference between the local carrier and the signal originating from bandpass filter $BPF_2$, and also a lowpass filter $F_1$ to obtain a control signal for generator $VCO_1$. As phase detector PD is of the multiplier type, phase lock of this loop PLL occurs at a nominal phase difference of 90° between the two input signals of phase detector PD, so that, irrespective of a constant scale factor the local carrier can be written as $$\cos(2\pi f_c t + \theta_o)$$

wherein $\theta_o$ is the local carrier phase and the phase error $\theta_e = \theta_c - \theta_o$ on phase-lock is very small. This local carrier from generator $VCO_1$ is applied to demodulator DEM through a 90° phase-shifter PS. The time delay of delay-compensating element $D_1$ must be chosen such that the phase-shift introduced thereby at carrier frequency $f_c$ is an integral multiple of 180° so that the BPSK-signals applied to demodulator DEM and remodulator REM have an appropriate mutual phase relationship. This value of 180° results from the fact that phase-locked loop PLL can lock at both a nominal phase error $\theta_e = 0°$ and at a nominal phase error $\theta_e = 180°$. On the other hand this phase ambiguity is not a shortcoming of phase-locked loop PLL but a typical property of all PSK-techniques (cf. the said Section 11.2 of the book by Gardner). The influence of this phase ambiguity on the data transmission can be eliminated in known manner by utilizing differential encoding in the transmitter prior to the BPSK-modulation and by utilizing differential decoding in the receiver subsequent to the BPSK-demodulation and the regeneration. This differential decoding of regenerated data signal $a_R(t)$ for the data transmission proper is not shown in the receiver of FIG. 1 since this decoding is of minor importance for the present description.

As regards the practical implementation of phase-locked loop PLL in the described carrier recovery system it should be noted that its (3 dB) bandwidth is chosen such that also for the maximum frequency deviations of its input signal to be expected relative to the nominal value of $f_c = 70$ MHz the loop PLL will still sufficiently rapidly pass from the non-locked state to the locked state. A frequency deviations of not more than 5 KHz a value of, for example, 20 KHz for the (3 dB) bandwidth of loop PLL is amply sufficient. After the phase lock has been obtained, this (3 dB) bandwidth is reduced to a value of, for example, 1 KHz to reduce the phase jitter of the local carrier. This can be effected in known manner by switching resistors in loop filter $F_1$ under the control of the smoothed ouput signal of a quadrature phase detector (not shown in FIG. 1) which in the most current designs of a phase-locked loop is already present as a locking indicator (cf. pp. 88–89, of the book by Gardner). In addition, bandpass filter $BPF_2$ is preferably implemented as a bandpass limiter so as to apply a signal of constant amplitude to phase detector PD in phase-locked loop PLL. The influence of the limiter on the signal-to-noise ratio (SNR) is restricted to a very small deterioration of not more than 1.05 dB for very low SNR values at the input (cf. Section 6.11, pp. 125–128 of the book by Gardner). The phase-shifts occurring in bandpass filter $BPF_2$ in response to frequency deviations of its input signal relative to its center frequency of $f_c = 70$ MHz always remain limited to very low values at the selected value of 200 KHz for the (3 dB) bandwidth and the maximum value of 5 KHz for these frequency deviations.

The attractiveness of the described carrier recovery system can be demonstrated by comparing this system with two other systems, whose behaviour is described on pages 226–230 of Gardner's book. In this comparison, the relevant circumstances are the same for all systems, that is to say that the same bandpass filter $BPF_1$ and the same phase-locked loop PLL are used and that in addition the signal-to-noise ratio SNR in the passband of filter $BPF_1$ has the same value for all systems. In the first prior art system, an unmodulated carrier is applied to filter $BPF_1$ and loop PLL is directly connected to the output of filter $BPF_1$. The second prior art system differs from the present system in that the demodulated data signal at the output of lowpass filter LPF is used for the BPSK-remodulation in remodulator REM. In Gardner's book, the first prior art system is characterized as a first-order system ($N=1$) since the control signal in the loop PLL is proportional to Sin ($\theta_e$), wherein $\theta_e = \theta_c - \theta_0$ is the phase error. The second prior art system is characterized as a second-order system ($N=2$) since the control signal in the loop PLL is proportional to sin ($2\theta_e$), and furthermore the influence of the multiplicative noise on remodulation is represented by a loss factor which increases within decreasing SNR-values. The behaviour of these two prior art systems is illustrated in FIG. 11.11 of the book by Gardner by the curves for $N=1$ and $N=2$. If now in the system shown in FIG. 1 it is assumed that the clock phase error pT is very small, then it appears that for high SNR-values, for which multiplicative noise on remodulation in response to bit errors may be neglected, the present system behaves as a first-order system as the control signal in the loop PLL is proportional to sin ($\theta_e$). In addition, it appears that at decreasing SNR-values, a slowly increasing deterioration indeed occurs compared with a first-order system, but that the behavior of the present system, also at low SNR-values, is still significantly better than that of a second-order system.

In order to achieve the improved reliability of the recovered carrier at low SNR-values, the receiver must provide for a local clock having a bit rate 1/T which is still sufficiently reliable at these low SNR-values. In the present receiver a novel concept is now used for the recovery of this local clock from the received BPSK-signal, which novel concept utilizes both coherent demodulation with the aid of the local carrier and also correlation of the data signal a(t) inherent to the received BPSK-signal with delayed and advanced versions of the fully regenerated data signal $\hat{a}_R(t)$ so as to generate a control signal for local clock generator $VCO_2$.

In the receiver of FIG. 1, this novel concept is implemented as follows. Data regenerator DR and timing unit TU are arranged to generate both the regenerated data signal $\hat{a}_R(t)$ and also advanced and delayed versions $\hat{a}_E(t)$ and $\hat{a}_L(t)$ of data signal $\hat{a}_R(t)$, the advance and the delay both corresponding to a shift a time interval $\Delta$ less than bit interval T. For the case a time interval $\Delta = T/4$ is chosen, it then holds that $$\hat{a}_E(t) = \hat{a}_R(t+T/4) = \hat{a}_L(t+T/2)$$

Figure 2:
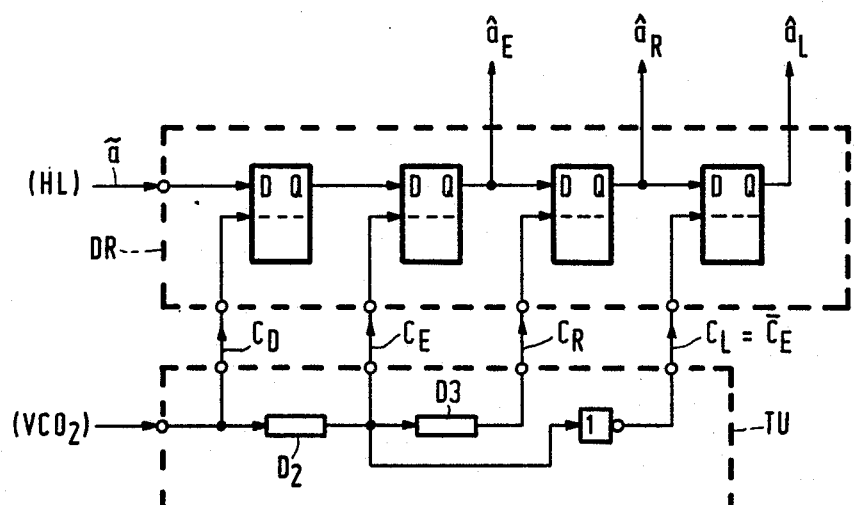
FIG. 2: is a block diagram of regeneration means suitable for use in the receiver of FIG. 1.
Figure 3:
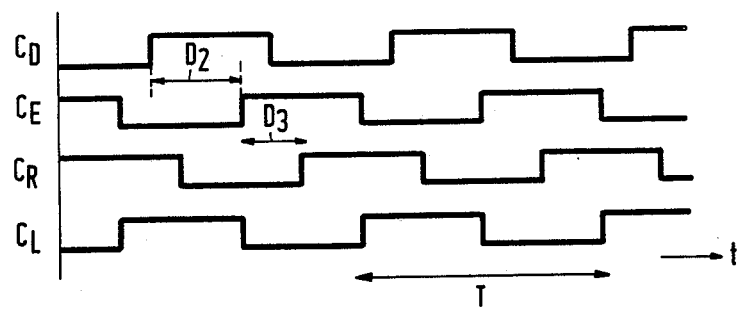
FIG. 3: shows four time diagrams of the clock signals used in the regeneration means of FIG. 2.

A possible practical implementation of data regenerator DR and timing unit TU for this case is illustrated in FIG. 2 and the associated clock signals are shown in FIG. 3. Data regenerator DR comprises a cascade arrangement of four D-flipflops which are interconnected in the manner shown in FIG. 2. The input of this cascade receives data signal $\bar{a}(t)$ at the ouptut of hard limiter HL in FIG. 1 and the respective regenerated data signals $a_E(t)$, $\hat{a}_R(t)$ and $\hat{a}_L(t)$ are available at the output of the second, third and fourth D-flipflops. The respective clock signals $C_D$, $C_E$, $C_R$ and $C_L$ for the four D-flipflops are derived in timing unit TU of FIG. 2 from the local clock from clock generator $VCO_2$ in FIG. 1. This local clock constitutes the clock signal $C_D$ for the first D-flipflop and the furher clock signals $C_E$, $C_R$ and $C_L$ are derived from the local clock with the aid of two delay elements $D_2$, $D_3$ and an inverter which are interconnected in the manner shown in FIG. 2. The time delay produced by element $D_3$ is equal to the time interval $\Delta = T/4$. As regards the time delay of element $D_2$ it should be noted that delay element $D_1$ in FIG. 1 now must also produce a compensating delay for the time interval $\Delta = T/4$ through which regenerated data signal $\hat{a}_R(t)$ is delayed relative to regenerated data signal $\hat{a}_E(t)$. For the time delay of element $D_1$ a value of 1.25 T is chosen which satisfies the requirement that the phase-shift produced thereby at carrier frequency $f_c$ is an integral multiple of 180° and is also adequately sufficient to compensate in the formation of data signal $\hat{a}_E(t)$ for the time delay of lowpass filter LPF. The difference between the time delay of this lowpass filter LPF, which is, for example, 0.625 T, and the duration T of one bit interval is compensated with the aid of delay element $D_2$ in timing unit TU, this element $D_2$ consequently having in this example a time delay of 0.375 T.

To assure that regenerated data signal $\hat{a}_R(t)$ is in synchronism with data signal a(t) inherent to the BPSK-signal applied to remodulator REM, local clock generator $VCO_2$ in the receiver of FIG. 1 is included in a clock tracking unit CTU which further includes means which, in response to this BPSK-signal and the local carrier, generate a baseband control signal for clock generator VCO$_2$. To that end, clock tracking unit CTU includes two PSK-remodulators M$_L$ and M$_E$ which in this case are again constituted by multipliers. The filtered and delayed BPSK-signal at the output of delay element D$_1$ is PSK remodulated in remodulators M$_L$ and M$_E$ in accordance with the delayed version $\hat{a}_L(t)$ and the advanced version $\hat{a}_E(t)$, respectively, of regenerated data signal $\hat{a}_R(t)$. With the aid of an adder AD the output signal of remodulator M$_E$ is subtracted from the output signal of remodulator M$_L$ and the carrier component of the differential signal at the output of the adder AD is thereafter selected by means of a bandpass filter BPF$_3$ and coherently demodulated in a demodulator CD with the aid of the local carrier at the output of phase-shifter PS. Finally, the baseband control signal for local clock generator VCO$_2$ is obtained with the aid of a lowpass filter F$_2$ connected to demodulator CD.

The main character of this baseband control signal can now be derived by, as also done in the forgoing, leaving the influence of filtering and noise out of a account and thus by writing the BPSK-signal applied to clock tracking unit CTU as $$a(t) \cdot \sin(2\pi f_c t + \theta_c)$$

Remodulation of this BPSK-signal in accordance with the delayed and advanced version $\hat{a}_L(t)$ and $\hat{a}_E(t)$ of regenerated data signal $\hat{a}_R(t)$ then results in the output signals $$\hat{a}_L(t) \cdot a(t) \cdot \sin(2\pi f_c t + \theta_c)$$

$$\hat{a}_E(t) \cdot a(t) \cdot \sin(2\pi f_c t + \theta_c)$$

of remodulators M$_L$ and M$_E$. When phase-locked loop PLL has reduced the phase error $\theta_e = \theta_c - \theta_o$ to the value zero, so that, neglecting a constant scale factor, the carrier derived from phase-shift PS can be written as $$\sin(2\pi f_c t + \theta_c)$$

then the subtracting operation in adder AD and the subsequent coherent demodulation in demodulator CD results in a baseband output signal of shape $$\hat{a}_L(t) \cdot a(t) - \hat{a}_E(t) \cdot a(t)$$

neglecting a scale factor 0.5. In the absence of transmission errors, regenerated data signal $\hat{a}_R(t)$ is a version $a(t+pT)$ of data signal $a(t)$, shifted over a time interval pT, pT being the clock phase error of the local clock. On the basis of the relations between $\hat{a}_E(t)$, $\hat{a}_L(t)$ and $\hat{a}_R(t)$, the baseband output signal of demodulator CD can then be written as $$a(t+pT-T/4) \cdot a(t) - a(t+pT+T/4) \cdot a(t)$$

Since lowpass filter F$_2$ forms the average value of this signal over time interval which is very large relative to the bit interval T, the output signal of this filter F$_2$ is given to a very good approximation by $$\overline{a(t+pT-T/4) \cdot a(t)} - \overline{a(t+pT+T/4) \cdot a(t)}$$

the subscript line symbolizing the mathematical averaging operation. Now the autocorrelation function $R(\tau)$ of data signal $a(t)$ is defined as $$R(\tau) = \overline{a(t) \cdot a(t+\tau)}$$

so that the output signal of filter F$_2$ and consequently the control signal for clock generator VCO$_2$ can be written as $$R(pT-T/4) - R(pT+T/4)$$

Figure 4:
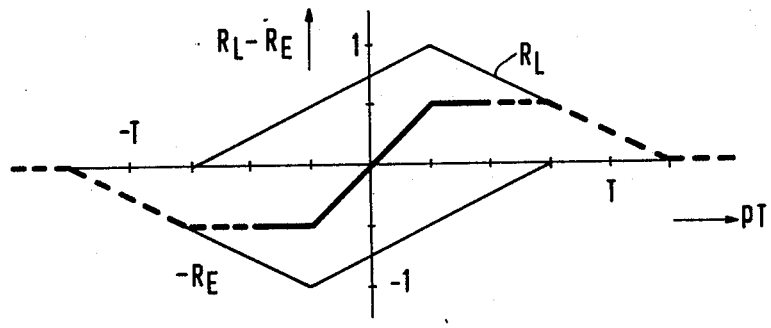
FIG. 4: shows the shape of the control signal for the local clock generator of FIG. 1.

FIG. 4 shows the shape of this control signal as a function of the clock phase error pT for the case in which the symbols of binary data signal $a(t)$ have a waveform of the NRZ-type and assume the values $+1$ and $-1$. In FIG. 4, the two terms of the above expression are shown separately, the first term being denoted by R$_L$ and the second term by $-$R$_E$, so that the control signal is given by R$_L$$-$R$_E$. Since the clock phase error pT can never exceed T/2, the control signal is always located in that portion of the control curve R$_L$$-$R$_E$ in FIG. 4 that is represented by a fat line.

In the above discussion, filtering of the BPSK-signal in the transmitter and in bandpass filters BPF$_1$, BPF$_3$ of the receiver of FIG. 1 are not taken into consideration. This filtering results in the shape of the composite parts R$_L$ and R$_E$ of the control curve deviating from the triangular shape of the autocorrelation function of data signal $a(t)$ that is shown in FIG. 4, but it will indeed retain substantially the same character. Consequently, FIG. 4 remains representative of the main character of the control curve R$_L$ in R$_E$.

As regards the influence of noise, the description of deriving the control signal brings out an important advantage of the novel method for recovering the local clock from the received BPSK-signal. In contrast to other, known methods (cf. pp. 230-249 of the book by Gardner), this novel method for generating the control signal for clock generator VCO$_2$ does not utilize elements having a non-linear amplitude transfer characteristic which result in the introduction of additional noise in this control signal. Thus, it will be possible to ensure a reliable recovery of a local clock with little phase jitter at lower SNR-values at the receiver input contrary to the other known methods used.

As regards the practical implementation of the system (CTU, TU, DR) shown in FIG. 1 for the clock recovery it should be noted that the (3 dB) bandwidth of the loop formed by this system is chosen such that also for the maximum frequency deviations to be expected of the clock in the transmission system relative to the nominal value of $1/T = 1$ MHz the loop will still sufficiently rapidly pass from the non-locked state to the locked state. At clock frequency deviations that in practice will be much less than 100 Hz, a value of, for example, 250 Hz for the (3 dB) loop-bandwidth is adequately sufficient for that purpose. Since this loop-bandwidth is predominantly determined by the bandwidth of lowpass loop filter F$_2$, the (3 dB) bandwidth of bandpass filter BPF$_3$ is of minor importance. In the example described, a rather arbitrary value of 200 KHz is chosen for this (3 dB) bandwidth of bandpass filter BPF$_3$.

After the extensive explanations already given it will be evident that the novel concept for clock recovery results in an improved reliability of the recovery of the carrier for low SNR-values at the input of the receiver. This improved reliability is confirmed by experiments in which the described example of the receiver of FIG. 1 was used, in which experiments the SNR-value at the input of the receiver is indicated by the value, expressed in dB, of the ratio $E_b(N_O)$, wherein $E_b$ is the received signal energy per bit interval T and $N_O$ is the spectral power density of additive white Gaussian noise. These experiments proved that the present system for the combined recovery of the carrier and the clock remains in the locked state up to values values $E_b/N_O$ of approximately $-10$ dB, which means an improvement of 4-6 dB compared with known second-order systems for the recovery of the carrier.

From the explanations given and also from the block diagram of FIG. 1 it will be clear that in the present receiver there is a strong connection between the recovery of the carrier, the recovery of the clock and the detection of the data signal. Errors in any one of these three processes influence the other two processes. Because of this strong connection the questions arises whether the present system for the combined recovery of the carrier and the clock can change from the non-locked state to the locked state. This question can be answered in the affirmative, as, at a deviating clock frequency, the clock phase error pT cannot become greater than T/2, as was explained in the foregoing. When in this case the carrier loop PLL is in the locked state, the probability of incorrectly detected data bits at values $E_b/N_O$ which are not too low will not become greater than 0.25. In this situation there still is at the output of remodulator REM a carrier component having a sufficient power for a reliable recovery of the carrier. So clock recovery is in principle not necessary for the carrier recovery. In contrast thereto, to enable clock recovery, a recovered carrier is indeed necessary for the coherent demodulation in demodulator CD of clock tracking unit CTU. When the carrier loop PLL is in the non-locked state, for example on switch-on of the receiver, the carrier phase error $\theta_e$ as a function of time will vary with a frequency equal to the frequency difference between the two input signals of phase detector PD. If this frequency difference is much smaller than the clock frequency 1/T, which generally is the case, this phase error $\theta_e$ varies from 0° to 360° in a manner that is slow compared to the bit rate 1/T at which the data signal varies. During one period (of 360°) of this varying phase error $\theta_e$ many data bits are detected, however with an error rate which depends on clock phase error pT and carrier phase error $\theta_e$. During this 360° period two ranges occur in which data bits are detected with a minimum error rate, more specifically the ranges around the values $\theta_e = 0°$ and $\theta_e = 180°$. These ranges are stable points onto which the carrier loop PLL can lock, since the variation of the phase error $\theta_e$ is very slow compared to the variation of the data signal of the bit rate 1/T and consequently a sufficient number of data bits is correctly detected to produce at the output of remodulator REM a carrier component having a sufficient power to bring the carrier loop PLL into the locked state. After locking of the carrier loop PLL a reliably recovered carrier is available for the coherent demodulator CD in clock tracking unit CTU, so that also the clock loop (CTU, TU, DR) can lock. Thus, the combined system for the recovery of the carrier and the clock has been brought in its totality from the non-locked state into the locked state. From said experiments with the described example of the receiver of FIG. 1 it was found that, after loss of lock, the present system for the combined recovery of carrier and clock again reaches the locked state for values $E_b/N_o$ greater than approximately $-6$ dB.

Figure 5:
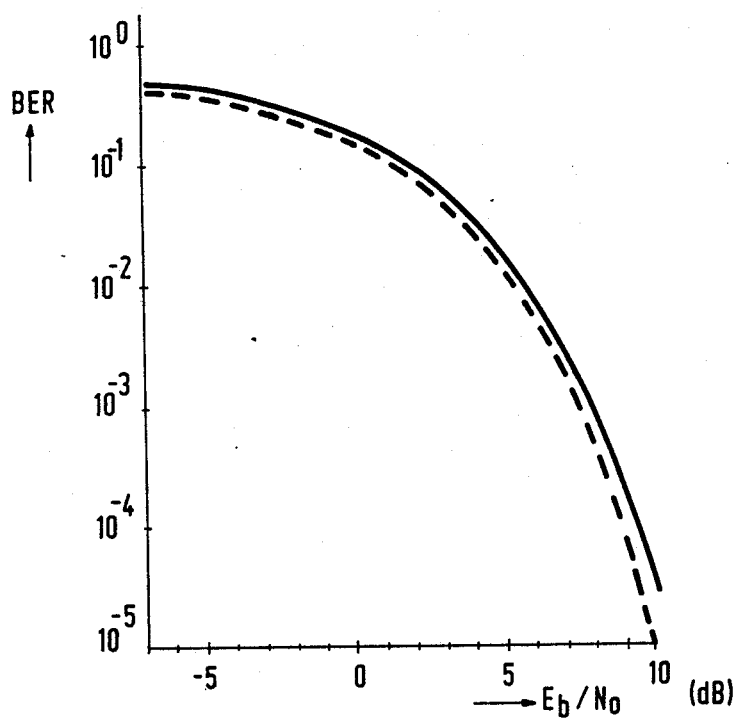
FIG. 5: shows two curves to illustrate the bit error rate (BER) as a function of the SNR-values at the input of the receiver of FIG. 1.

The performances of the present system are clearly visible in FIG. 5 which shows the bit error rate (BER) as a function of $E_b/N_O$. In view of the phase ambiguity already mentioned (phase-locked loop PLL can lock at $\theta_e = 0°$ or at $\theta_e = 180°$), the BER-value shown in FIG. 5 does not relate to the bits of regenerated data signal $\hat{a}_R(t)$ used for the BPSK-remodulation, but to data bits which were derived from the bits of $\hat{a}_R(t)$ by means of differential decoding, differential coding being used in the transmitter for forming the bits of data signal a(t). The broken-line curve in FIG. 5 shows for these differentially decoded data bits the BER-values which are theoretically feasible. The solid-line curve in FIG. 5 represents the BER-values measured for the same case in the experiments already mentioned in the foregoing. FIG. 5 shows that, in comparison with the theoretical situation, the present system results in a slight deterioration which is less than 1 dB. In addition, it appears that also at very low values for $E_b/N_O$ the data bits can still be detected. Of course the BER-value is then relatively high, but the influence thereof can effectively be combated by means of error-correcting codes as long as the present system remains in the locked state, which, as has been mentioned already, is the case up to values $E_b/N_O$ of approximately $-10$ dB. These experiments also show the present system is rather insensitive to disturbing signals. It was found more specifically that the present system always remains in the locked state as long as the power of an interfering carrier at the input of the receiver is less than the received power of the desired signal, even for interfering carriers having a frequency near the carrier frequency $f_c = 70$ MHz of the desired signal.

So far the system for the combined recovery of the carrier and the clock has been described for the case of a BPSK-signal. The present invention is however not limited to BPSK-signals, as the same principles can also be applied to other types of PSK-signals. This will now be described by way of example for the case of a receiver for quarternary PSK-signals (denoted as QPSK-signals or as four-phase signals).

This explanation can be a short explanation, as a receiver for a QPSK-signal basically only differs from the receiver shown in FIG. 1 for a BPSK-signal in that demodulator DEM and remodulator REM in FIG. 1 are replaced by their QPSK-equivalents, which are known per se, in the manner shown in FIG. 11.8 on page 223 of the book by Gardner. As regards demodulator DEM this implies that the output of filter BPF$_1$ is connected to a second amplifier to which the quadrature-phase carrier (which is already available at the input of phase-shifter PS) is applied and from which, with the aid of a second lowpass filter (which corresponds to lowpass filter LPF) a second demodulated data signal is derived which is inherent to the quadrature component of the QPSK-signal. The second data signal is thereafter regenerated as regards amplitude and instant of occurrence, with the aid of a second hard-limiter (corresponding to hard-limiter HL) and a second data generator (which differs from data regenerator DR in that the last D-flipflop in the cascade arrangement can be omitted and only the output of the third D-flipflop is utilized), the second data regenerator also being controlled by timing unit TU (with the exception of clock signal $C_L$ which is now superfluous). As regards remodulator REM, this means that the output of delay element D$_1$ is also connected to a second multiplier for remodulating the QPSK-signal in accordance with the regenerated second data signal for producing a second carrier component which, through a $-90°$ phase-shifter, is added by means of an adder to the carrier component which had already been obtained at the output of the first multiplier, whereafter the output signal of this adder is applied to bandpass filter BPF$_2$. The carrier loop PLL and the clock tracking unit CTU need, however, not to be modified.

In addition, the possibility is pointed out to implement within the frame work of the invention the clock tracking unit CTU in a manner other than the manner shown in FIG. 1. From the explanation of clock tracking unit CTU of FIG. 1 as given in the foregoing, it will be apparent that for instance the order of the operations performed in coherent demodulator CD on the one hand and the combination of remodulators $M_L$, $M_E$ and adder AD on the other hand can be interchanged, so that first the coherent demodulation and thereafter the multiplication by the delayed and advanced versions $â_L(t)$ and $â_E(t)$ of regenerated data signal $a_R(t)$ are performed. Of course a lowpass filter connected to the output of the displaced demodulator CD must be substituted for bandpass filter BPF$_3$, and the delay produced by such a filter must be taken into account of in the choice of the connecting point of clock tracking unit CTU for receiving the filtered and, optionally, delayed BPSK-signal at the output of bandpass filter BPF$_1$. This measure and further measures necessary for maintaining the desired time and phase relationships between the different signals in the receiver of FIG. 1 are fully within the scope of a person skilled in the art and, after taking cognizance of the foregoing description need no further explanation. It should however be noted that from the point of view of practical implementation, preference is given to the design of clock tracking unit CTU shown in FIG. 1.

Finally it should be noted that it is possible to implement, in the event of QPSK-signals, the remodulators $M_L$ and $M_E$ also for QPSK-remodulation in the manner already described for remodulator REM. After the extensive descriptions already given in the foregoing also this possibility needs no further explanation.

We claim:

1. A receiver for a passband signal generated by a phase-shift keying of a carrier in accordance with a data signal of a predetermined symbol rate 1/T, the receiver comprising:

demodulation means for demodulating said received passband signal and thereby producing a demodulated data signal;

regeneration means coupled to said demodulation means for regenerating said demodulated data signal with the aid of a local clock as provided by a local clock generator and thereby producing a regenerated data signal; and carrier recovery means coupled to said demodulation means, which comprises a phase-locked loop having a local carrier generator for providing a local carrier, and a first remodulator for phase-shift keying of said received passband signal in accordance with said regenerated data signal and thereby producing a carrier component as an input signal for said phase-locked loop;

a local clock generator connected to the regeneration characterized in that, said regeneration means produces a delayed and advanced versions of the regenerated data signal with a delay and an advance, respectively, relative to the regenerated data signal, over a time interval $\Delta$ less than symbol interval T, and said receiver also includes means responsive to said received passband signal and said local carrier for generating a baseband control signal for said local clock generator, said baseband control signal being representative of the difference between the correlation function of the data signal inherent to said received passband signal with said delayed version of the regenerated data signal and the correlation function of the data signal inherent to said received passband signal with said advanced version of the regenerated data signal, said local clock generator, in response to said baseband control signal, providing said local clock to said regeneration means so that said regenerated data signal is in synchronism with said data signal which is inherent to said received passband signal applied to said first remodulator.

2. A receiver as claimed in claim 1, wherein said means for generating a baseband control signal comprises:

a second remodulator for phase-shift keying of said received passband signal in accordance with said delayed version of the regenerated data signal;

a third remodulator for phase-shift keying of said received passband signal in accordance with said advanced version of the regenerated data signal;

an adder connected to said second and third remodulators for producing a difference signal;

a bandpass filter connected to said adder for selecting a carrier component of said difference signal;

a demodulator connected to said bandpass filter for coherent demodulation of said selected carrier component with the aid of said local carrier; and a lowpass filter connected to said demodulator for providing said baseband control signal to said local clock generator.

* * * * *